United States Patent [19]

Weiss

[11] 4,253,139
[45] Feb. 24, 1981

[54] POWER CONVERSION AND REGULATION SYSTEM

[75] Inventor: Ernest Weiss, Coral Springs, Fla.

[73] Assignee: Burroughs Corporation, Detroit, Mich.

[21] Appl. No.: 965,465

[22] Filed: Nov. 30, 1978

[51] Int. Cl.³ .............................................. H02P 13/20
[52] U.S. Cl. ....................................... 363/95; 363/37; 363/40
[58] Field of Search ........................ 363/95, 96, 97, 98, 363/99, 19, 21, 23, 25, 28, 37, 39, 40

[56] References Cited

U.S. PATENT DOCUMENTS

| | | | |
|---|---|---|---|
| 3,205,424 | 9/1965 | Bates | 363/40 |
| 3,248,637 | 4/1966 | Albert et al. | 363/96 |
| 3,360,710 | 12/1967 | Barthold | 363/96 |
| 3,416,062 | 12/1968 | Bernhard et al. | 363/40 |
| 3,461,374 | 8/1969 | Rhyne, Jr. | 363/96 |
| 3,562,668 | 2/1971 | Bartlett et al. | 363/21 |
| 3,796,942 | 3/1974 | Bynum | 363/10 |
| 3,842,340 | 10/1974 | Brandquist | 363/96 |
| 4,042,873 | 8/1977 | Cox | 363/129 |
| 4,080,554 | 3/1978 | Nordby | 363/96 X |

OTHER PUBLICATIONS

*SCR Manual,* General Electric Co., 5th ed., 1972, pp. 362-366.

*Primary Examiner*—William M. Shoop
*Attorney, Agent, or Firm*—David G. Rasmussen; Kevin R. Peterson; Edward J. Feeney, Jr.

[57] ABSTRACT

A DC or AC power conversion and regulation system in which DC or rectified AC is applied to a voltage controlled oscillator (VCO). The output of the VCO is applied to a frequency sensitive filter whose frequency response is such that for a fixed input voltage the output voltage is a function of the input frequency. The output of the filter is applied to a transformer whose output may be rectified to provide a regulated DC output. A portion of the rectified DC is sampled and compared with a reference voltage to generate an error signal which is used in a feedback loop to control the operating frequency of the VCO.

16 Claims, 23 Drawing Figures

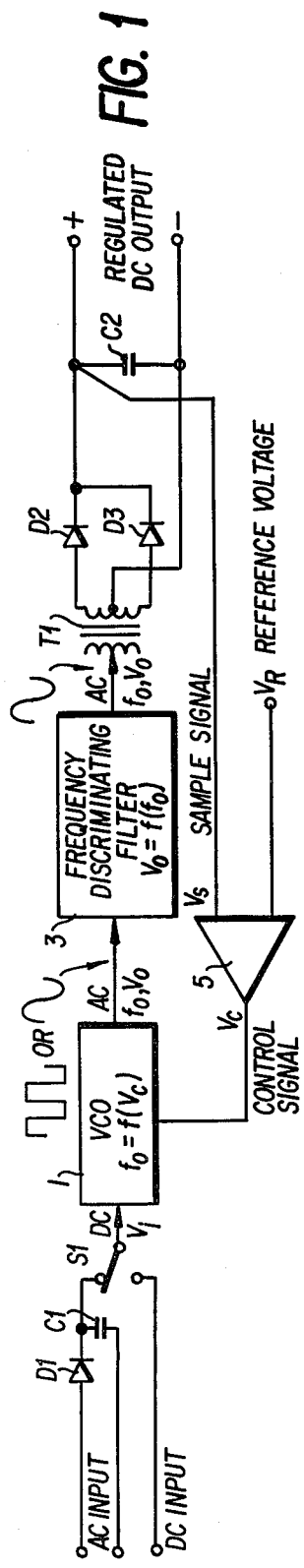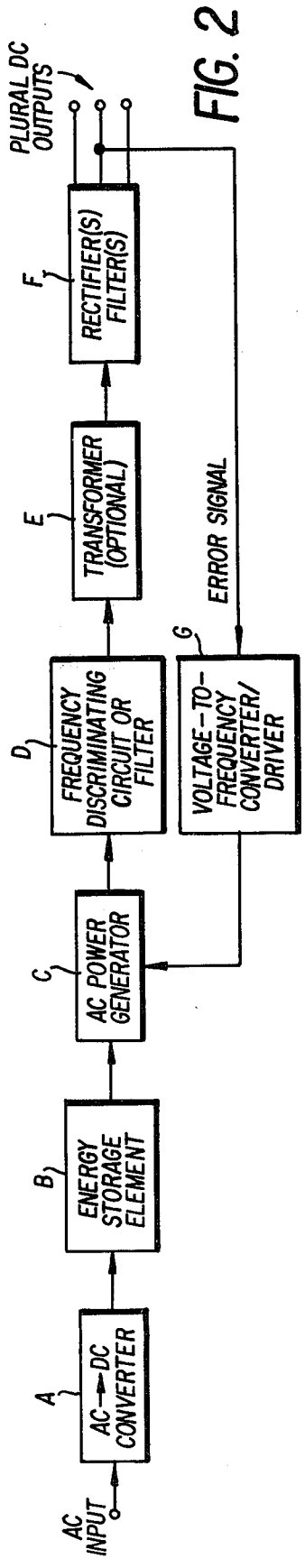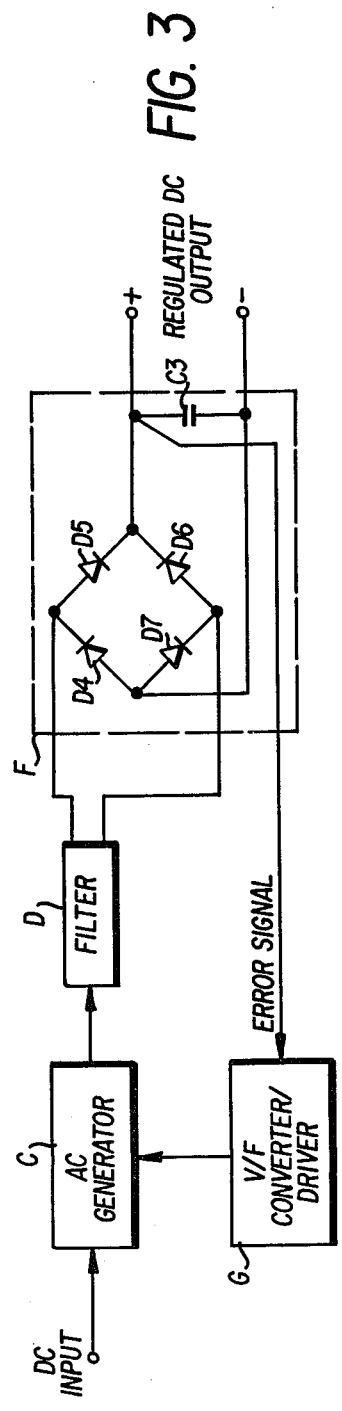

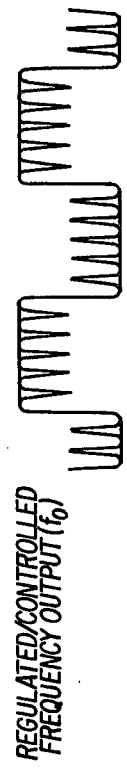
FIG. 4B
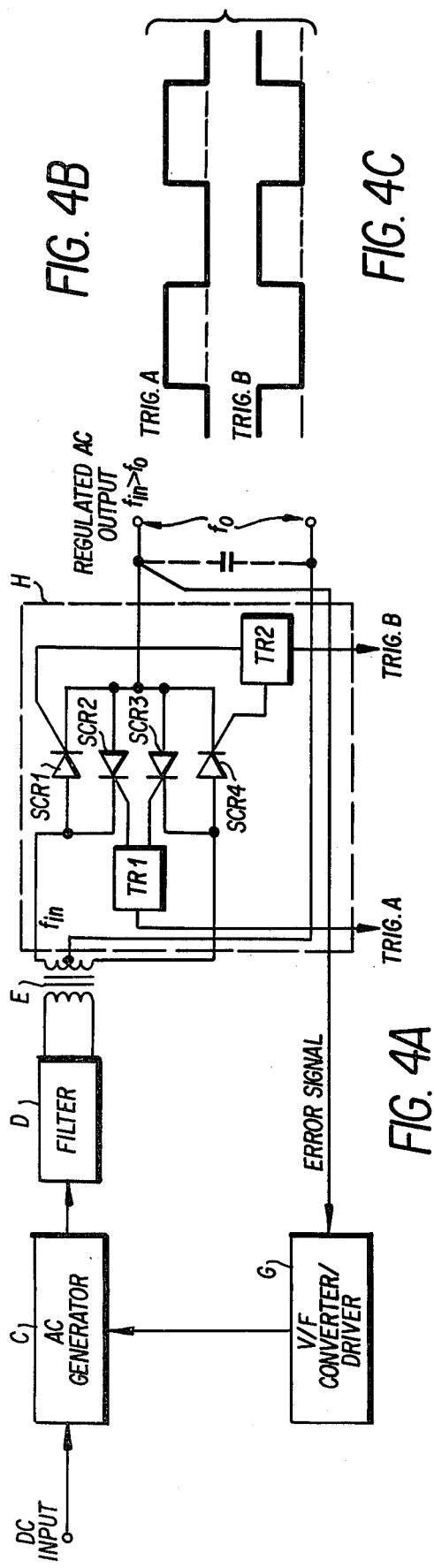
FIG. 4C
FIG. 4A
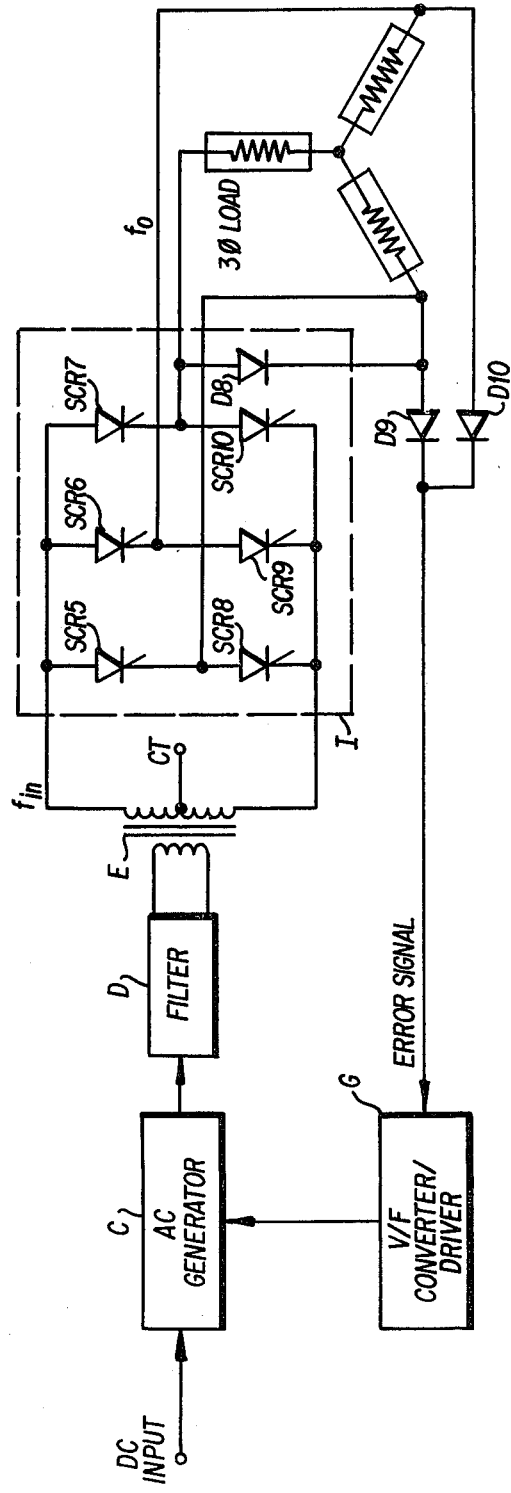
FIG. 5

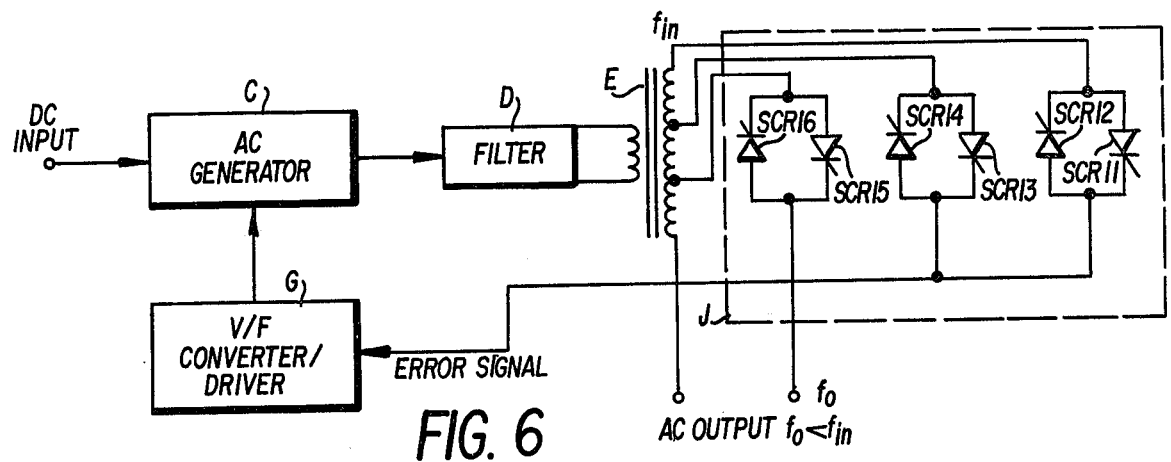
FIG. 6
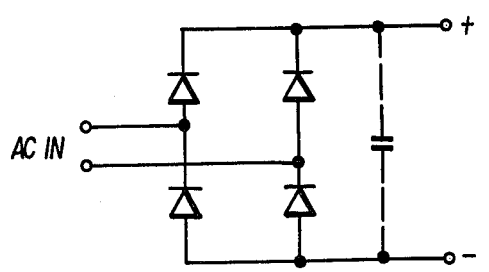
FIG. 7A SINGLE ∅ FULL WAVE RECTIFIER
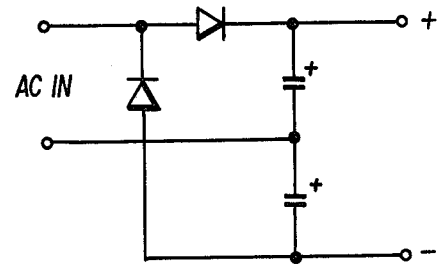
FIG. 7B SINGLE ∅ VOLTAGE DOUBLER
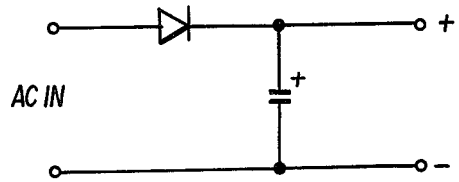
FIG. 7C SINGLE ∅ HALF WAVE RECTIFIER
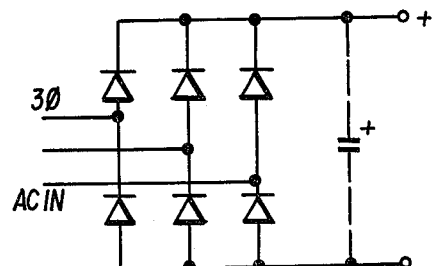
FIG. 7D 3∅ FULL WAVE RECTIFIER
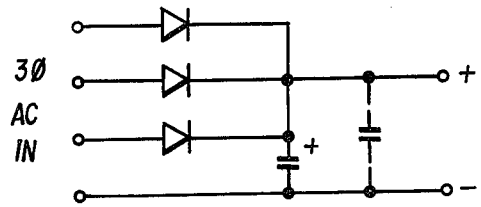
FIG. 7E 3∅ HALF WAVE RECTIFIER

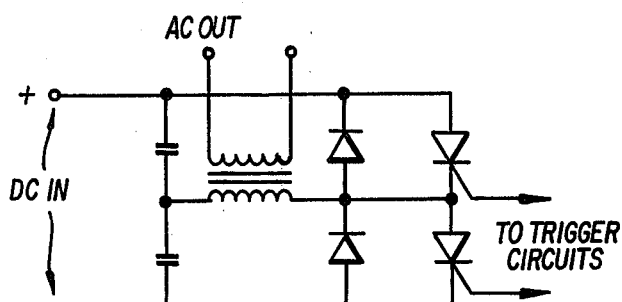
FIG. 8A AC GENERATOR
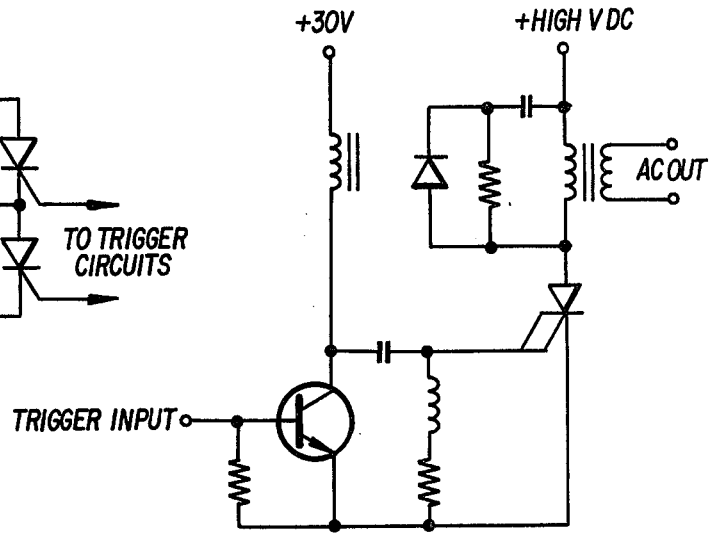
FIG. 8B SINGLE ENDED GTO AC GENERATOR
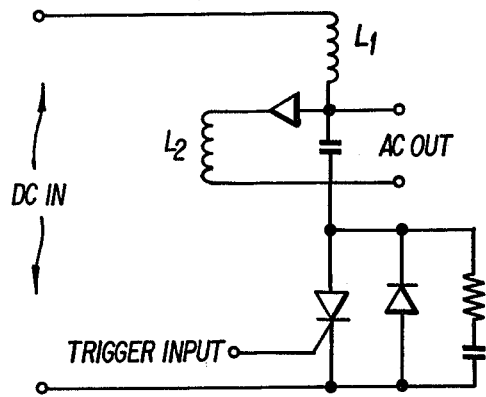
FIG. 8C SINGLE SCR AC GENERATOR
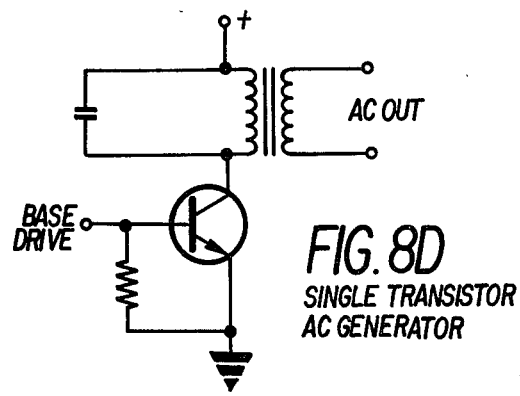
FIG. 8D SINGLE TRANSISTOR AC GENERATOR
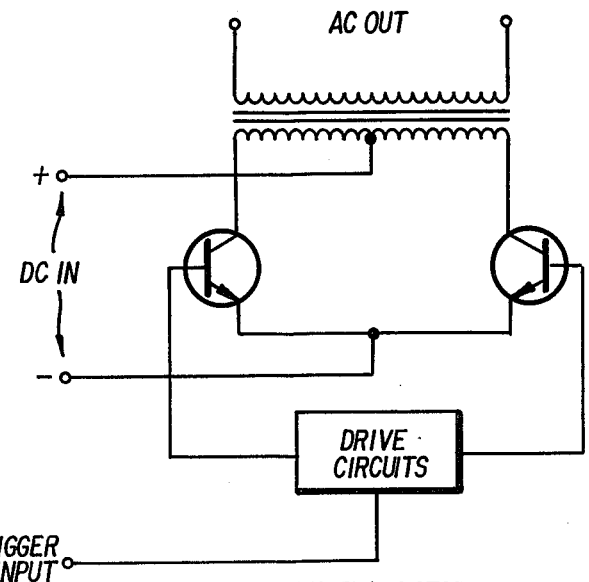
FIG. 8E TWO TRANSISTOR AC GENERATOR (TRIGGERED INVERTER)
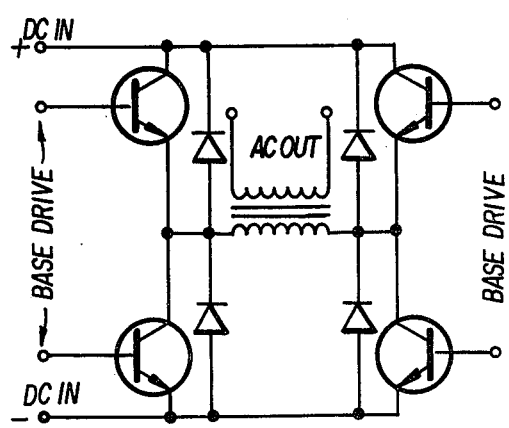
FIG. 8F FULL BRIDGE INVERTER AC GENERATOR

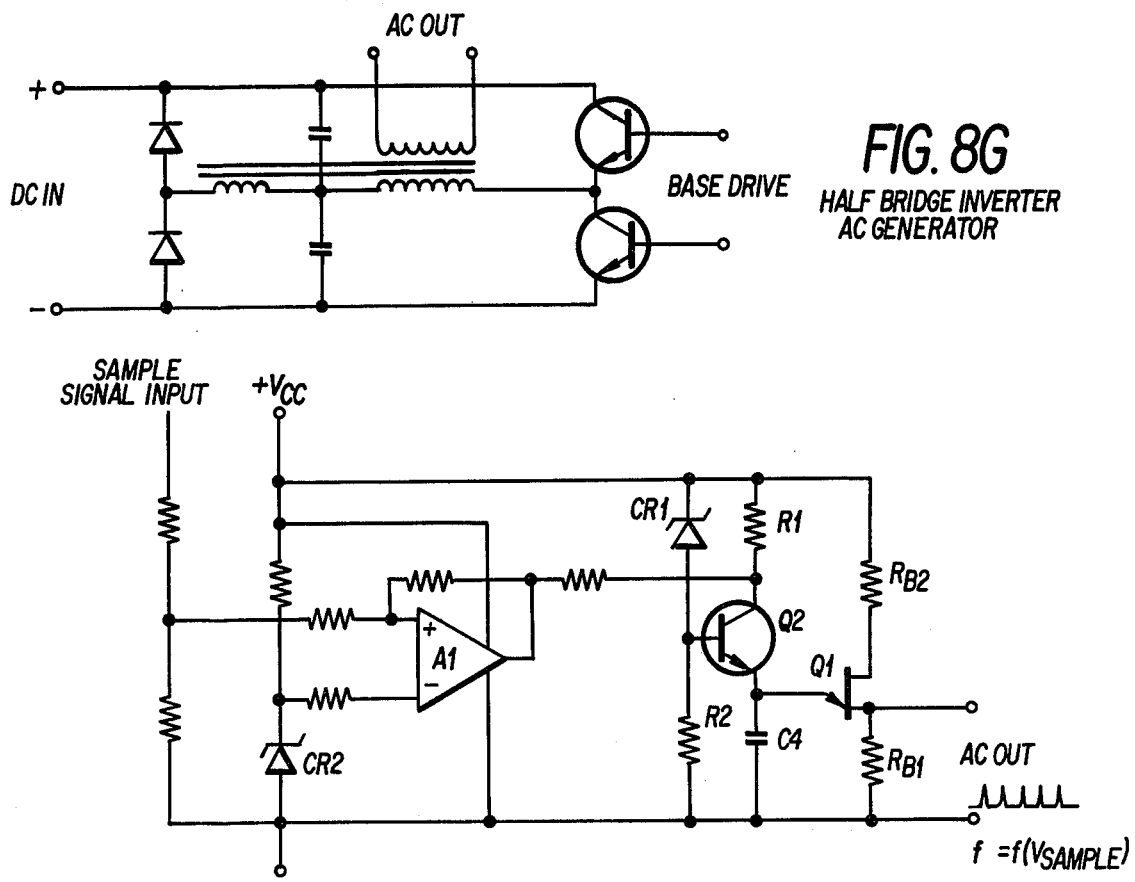
FIG. 8G HALF BRIDGE INVERTER AC GENERATOR
FIG. 9 VOLTAGE TO FREQUENCY CONVERTER/DRIVER
OUTPUT FREQUENCY ($f_0$) IS DETERMINED BY CHARGE CURRENT OF C4;
$T = 1/f_0 \approx R_1 C_4 \ln(1/1-n)$; $n \approx 0.63$
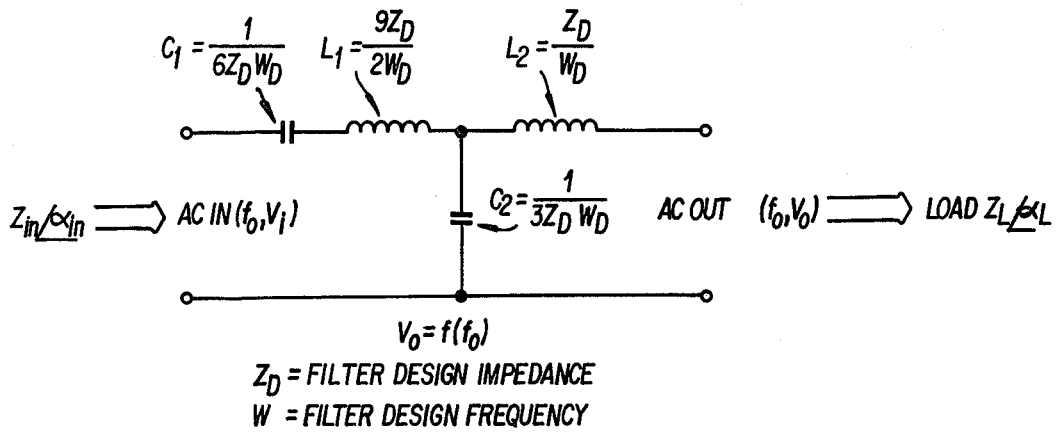
$Z_D$ = FILTER DESIGN IMPEDANCE
$W$ = FILTER DESIGN FREQUENCY
FIG. 10 FREQUENCY SENSITIVE FILTER

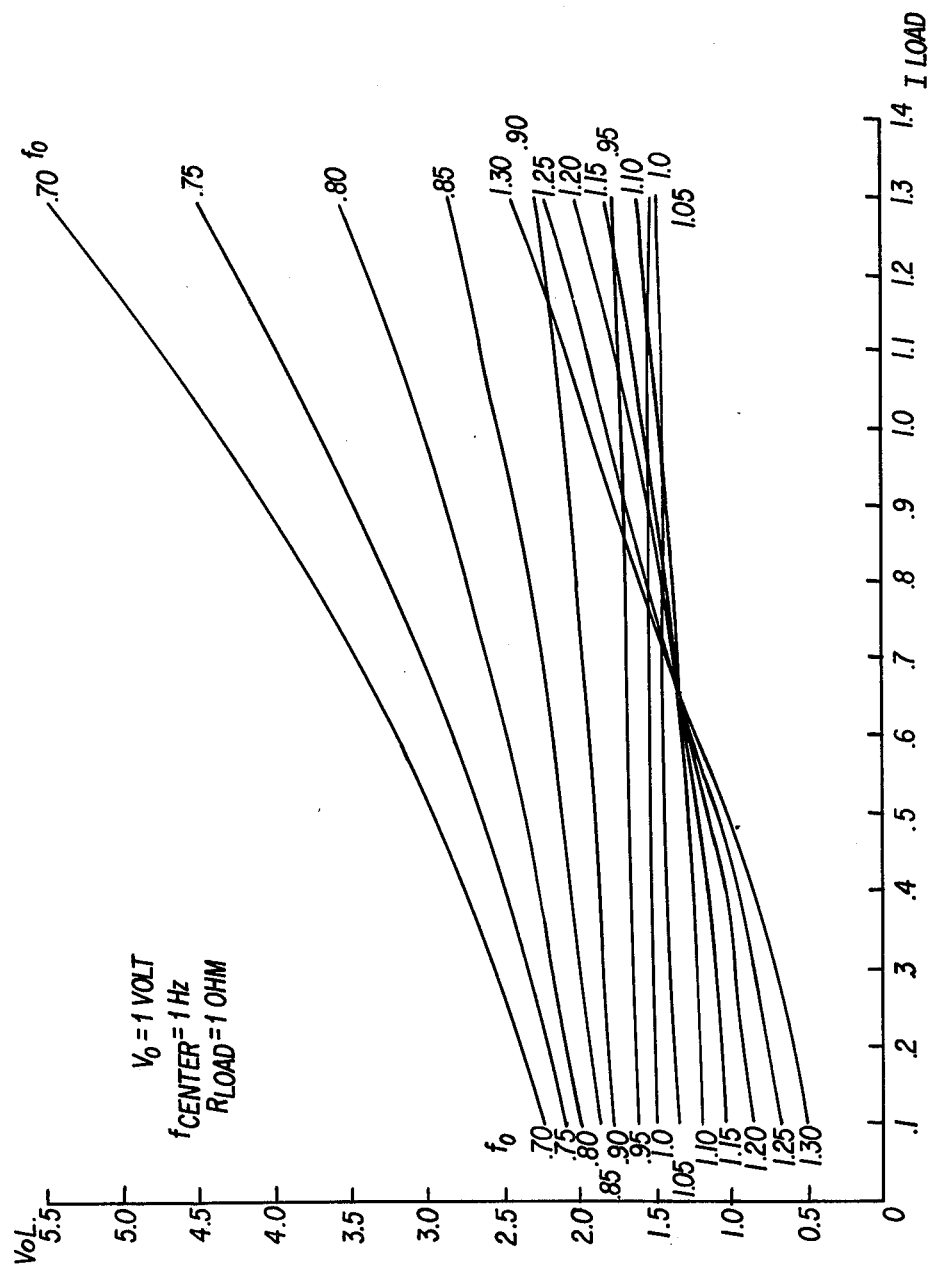

POWER CONVERSION AND REGULATION SYSTEM

BACKGROUND OF THE INVENTION

The invention relates to the field of electrical power conversion and regulation systems.

Various types of power conversion and regulation systems are well-known in the art. Modern electronic equipment which use microelectronic circuits or transistors generally require a low-voltage high-current power supply. Especially in devices which use digital logic, such as computers or microprocessors, there is a need to provide high power levels at a very precise voltage since in many such systems the difference in logic states is less than one volt.

Present techniques for regulating power involve the use of either dissipative regulators or switch mode regulators. Linear power supplies and associated dissipated regulators are highly inefficient and wasteful of energy and require bulky magnetics and massive heatsinks.

The basic techniques of switching power supplies are well-known, as shown in the article "Focus on Switching Power Supplies", *Electronic Design*, Vol. 26, No. 17, August 16, 1978, pp. 72-83. It is known that switching power supplies are highly efficient. In DC to DC converters, a switching power supply can deliver 60-90% efficiency as compared to linear supplies ' 20-50% efficiencies. Since most switching power supplies operate at around 20 kHz, components can be made smaller and lighter than in linear supplies.

However, prior art switching supplies suffer from several disadvantages. Chief among them that power regulation is generally poorer than with linear supplies. Also, prior art switching supplies produce a considerable amount of electromagnetic interference due to approximately 50 mv peak-to-peak noise pulses. Prior art switching supplies are limited in their power handling capabilities since the components capable of handling high power levels are intrinsically "slow" (i.e. have a long recovery period between power saturation cycles). This limits the use of high power components to lower switching frequencies (e.g. below 20 KHz) which lower the overall efficiency of the system and results in greater component size and high levels of acoustic noise. Typically rise and fall times of high power switching SCRs are limited to $\approx 10$ $\mu$sec or more which limits their dynamic range when operated at pulse width modulation (switching) frequencies above the audio range (20 KHz). Of course, switching transistors could be paralleled for high power handling; however, the matching and balancing requirements for a high power system renders this solution impractical.

Prior art switching supplies such as that shown in the *Electronic Design* article at page 78 comprise a DC input applied to a switching circuit (typically a number of SCRs driven at 20 KHz) with the high frequency square wave output of the switching circuit being applied to a voltage conversion device such as an inductor or transformer. The output of the transformer is then rectified and filtered to produce pure DC without a high frequency ripple. In order to regulate the output voltage, a portion of the DC output is sampled and compared with a reference voltage to produce an error signal which controls a pulse modulation circuit. The modulation circuit controls the firing of the SCR switching transistors to produce a regulated DC output.

U.S. Pat. Nos. 3,416,062 and 3,205,424 are representative of prior art pulse width modulated (switching) power supplies having a feedback loop from the output to the switching oscillator. The pulse train generated by the oscillator generally comprises a series of square waves accompanied by spurious harmonics. These harmonics are eliminated by a band pass filter placed in the output of the oscillator.

U.S. Pat. No. 4,042,873 discloses a phase-locked loop voltage regulator having a voltage controlled oscillator (VCO) which controls the firing of an SCR pulse driving circuit through a ramp generator and comparator circuit. An AC input is applied to a phase detector which compares the phase angle of the applied power with the phase angle of the VCO output. A detected phase difference is filtered through a low pass filter and used to control the VCO. A separate comparator circuit detects the voltage output of the VCO and compares it with a reference voltage to control the conduction of the VCO output to the SCR pulse driving circuit.

It is known to employ an active harmonic filter in a Class C inverter circuit. In a Class C inverter pure DC is converted to pulsed DC by a capacitor or LC network switched by a load-carrying SCR. An active harmonic filter, such as that described in the *GE SCR Manual*, 4th ed, 1967, pp. 235-236 and 248, has a frequency response such that for a fixed input voltage the output voltage is a function of the input frequency. Such a filter is also known as an OTT filter, after its inventor. However, in the circuit described the OTT filter merely acts as a harmonic filter to provide a sine wave output to a load. The filter provides good load regulation while maintaining a capacitive load to the Class C inverter over a large range of load power factors. It will be noted however, that the described OTT filter is employed merely as an active harmonic filter and load regulator and plays no part in the voltate regulation scheme of its associated Class C inverter. Indeed, it is noted on p. 226 of the *GE SCR Manual* that due to design and component limitations a Class C inverter is only useful for switching frequencies below 1000 Hz.

It can thus be seen that there is a need for a simple, efficient and economical power conversion and regulation system which can employ high power and high frequency switching techniques with good output regulation and low noise.

SUMMARY OF THE INVENTION

These and other disadvantages of prior art devices are overcome by the present invention wherein there is provided a power conversion and regulation system comprising power oscillator means connected to a DC input voltage and having an AC output frequency which is a function of an applied control voltage. The AC output of the oscillator, which may be a train of square or sinusoidal waves, is passed through a frequency discriminating or frequency sensitive filter means whose frequency response is such that for a fixed input amplitude the output amplitude is a function of the input frequency. The output of the filter means is substantially sinusoidal and is applied to a transformer primary. The output of the transformer secondaries may be rectified to produce regulated DC power. A portion of the rectified output is sampled and compared to a reference voltage to generate an error signal which is used to control the operating frequency of the oscillator means.

The invention also contemplates that the output transformer secondary may be utilized to provide a constant amplitude AC power carrier which is applied to a cycle-converter (single or multi-phase) to generate regulated AC power at a desired frequency. The error or feedback signal for controlling the oscillator means may be derived through rectification of the synthesized AC line output.

With the above system power conversion is performed simply and efficiently with a minimum of components. Using the frequency modulation technique as opposed to prior art, such as pulse width modulation techniques, has the advantage that the switching device(s) is always operated at close to 100% duty cycle, thereby utilizing the power handling capabilities of the switching element to its fullest extent. This is in contrast to a pulse width modulated system, where the operating currents are limited by the worst case duty cycle. Since the filter means acts as part of the regulation system a concomitant reduction in components is realized in the present invention as compared to prior art devices. Depending on the choice of switching devices employed in the oscillator means, frequencies of operation up to 70 kHz are readily achievably thus considerably reducing component sizes over that needed in prior art systems operating at around 20 KHz. EMI and audio noise are substantially reduced since the system may operate at frequencies much greater than 20 KHz and the active filter means produces a substantially smooth sinusoidal output from the square or sinusoidal output received from the oscillator means. Finally, the present invention is adaptable for use in various types of power conversion systems with a minimum of design variations from system to system while providing substantially better voltage regulation of the power output.

BRIEF DESCRIPTION OF THE DRAWINGS

These and other objects, features, and advantages of the present invention will be readily apparent from the following description of the preferred embodiment taken in conjunction with the appended claims and the accompanying drawing figures wherein:

FIG. 1 is a block diagram showing a simple form of the preferred embodiment of the present invention.

FIG. 2 is a general block diagram showing the various elements which may be incorporated into the present invention.

FIG. 3 is a block diagram of a DC to DC converter having a single output configuration which employs the concepts of the present invention.

FIG. 4A is a block diagram of a DC to AC inverter including frequency changing circuit;

FIG. 4B illustrates the input trigger signals to the trigger circuits shown in FIG. 4A.

FIG. 4C shows the output of the DC to AC inverter illustrated in FIG. 4A,

FIG. 5 is a block diagram of a DC to $3\phi$ AC inverter having a cycloconverter;

FIG. 6 is a block diagram of a DC to AC inverter having a switch-tap synthesizer;

FIG. 7A-7E shown various types of AC to DC converter circuits as could be used in block A of the circuits shown in FIGS. 2-6.

FIG. 8A-8G show various types of AC power generators or voltage controlled oscillators as could be used in block C of the circuits shown in FIGS. 2-6;

FIG. 9 shows one type of voltage to frequency converter and driver as could be used in block G of the circuits shown in FIGS. 2-6;

FIG. 10 shows one form of frequency sensitive filter circuit as could be used in block D of the circuits shown in FIGS. 2-6;

FIG. 11 is a graph plotting the normalized response of load current vs. input voltage for various frequencies of operation of the filter shown in FIG. 10.

DESCRIPTION OF THE PREFERRED EMBODIMENT

Turning to FIG. 1, there is shown a block diagram which illustrates a simple form of the voltage conversion and regulation system of the present invention. AC or DC sources are selected by switch S1. If the AC input is chosen the AC is converted to DC by half wave rectifier D1 and filtered by capacitor C1. Regardless of the input source chosen, DC having an input voltage of $V_i$ is applied to the voltage controlled oscillator (VCO) 1. VCOs of the type shown are well-known in the art and act to produce an AC output voltage of approximately $V_i$ at a frequency $f_o$ which is a function of an applied control voltage $V_c$.

The output of the VCO, which may be a train of square or sinusoidal waves, is passed through a frequency discriminating means here shown as frequency sensitive filter 3. Filter 3 has a frequency response such that for a fixed input amplitude $V_i$ the output amplitude $V_o$ is a function of the frequency of the applied pulse train, $f_o$. The output of filter 3 is substantially sinusoidal and may be applied to the primary transformer T1. The output of the secondaries of transformer T1 is rectified by full wave rectifier D2 and D3 and filtered by capacitor C2 to produce a regulated DC output.

A portion of the rectified DC output $V_s$ is applied to a comparator 5 which compares the sampled output voltage with a reference voltage $V_R$. A differential voltage or control signal $V_c$ is generated by comparator 5 and applied to the VCO to control the operating frequency $f_o$ of the VCO. The above described voltage conversion and regulation system thus produces a well-regulated DC output with a minimum of components. Unlike prior art regulation systems for switching power supplies which use a band-pass filter to eliminate harmonics and which are operable only within a narrow frequency range, the present invention may be used at switching rates of upwards of 70 kHz since a change in frequency applied to active filter 3 merely results in a change in its output voltage. Also, the filter means 3 of the present invention inherently provides a sine wave output for a square or sine wave input while also providing excellent load regulation throughout its operational range, as is more fully described below.

Referring now to FIG. 2, there is shown a generalized block diagram of a power conversion and regulation system which encompasses the major electrical elements which may be used in practicing the invention. It will be understood that the present invention may be used in a wide variety of power conversion systems; FIG. 2 is merely illustrative of the broad nature of the application of the concepts of the present invention.

As shown in FIG. 2, an AC input (single or plural phase) is applied to an AC to DC converter means A. The DC output of A may be applied to an energy storage element B, such as a capacitor or battery. Alternatively, if it is desired to operate directly from DC, the AC to DC converter A may be eliminated. In such a case the energy storage element B may be a primary electromotive force device such as a battery or DC generator.

The DC output of storage device B is next applied to an AC power generator means C. Generator C broadly functions to convert DC into AC. Preferably, as discussed above with respect to FIG. 1 generator means C may comprise a voltage controlled oscillator (VCO) though the application of the invention is by no means limited thereto.

The AC output of generator C is next applied to a frequency sensitive filter D. Filter D, described in more detail below, has the characteristic that its output amplitude is a function of the input frequency from generator C. While element D preferably takes the form of a frequency discriminating filter means, the broad concept of the present invention is meant to include other types of frequency discriminating elements, whether or not they are denoted filters as such. Thus, many types of well-known frequency discriminating elements may be used in the practice of the present invention so long as they provide an output amplitude which is a function of the input frequency.

The AC output of the filter means D may next be applied to a voltage level changing transformer means E, if desired. Transformer E and allied optional circuitry may be used to produce a single or multiphase AC output at a frequency equal to or different from that applied to the transformer E as will be discussed below. The output of transformer apparatus E may then be rectified and filtered by rectifier and filter means F to produce at least one DC output, or plural DC outputs as shown in FIG. 2.

A portion of the rectified output of circuit F is used to produce an error signal which is applied to voltage-to-frequency converter/driver means denoted at G in FIG. 2. A change in the voltage of the error signal acts to cause a corresponding change in the drive frequency of unit G. The output of G is used to drive the AC power generator circuit C. The error signal feedback loop through unit G provides a simple and reliable regulation scheme for controlling the output frequency of generator C. Since the output of generator C is applied to frequency discriminating element D which provides an output amplitude dependent on the applied frequency, a constant and regulated AC output is produced therefrom. The voltage regulation control loop of circuits C, D, the error signal, and unit G is relatively insensitive to changes in the voltage applied to generator C. The output of filter D may be rectified to produce a steady, well-regulated DC output.

Referring now to FIGS. 3-6 there are shown a variety of representative voltage conversion and regulation systems into which the concepts of the present invention may be incorporated.

FIG. 3 shows a DC-to-regulated-DC converter. Unregulated DC is applied to AC generator C, generator C being driven at a frequency of $f_o$ by voltage to frequency converter/driver G. The AC output of generator C is applied to frequency discriminating element D which produces an AC output at a frequency $f_o$, and whose amplitude is dependent on the applied frequency $f_o$. Since the output of element D is insensitive to any change in the DC input voltage applied to generator C the result is a constant and uniform output from element D. The output of element D is applied to a rectifier and filter unit F, comprising a full wave rectifier D4-D7 and a filter capacitor C3. The rectifier unit F produces a single positive/negative DC output. A portion of the DC output is sampled to provide an error signal to voltage to frequency converter G. Any change in the DC output voltage due to component ageing, heating, voltage transients, or other factors will cause the converter G to adjust the driving frequency of generator D in response to the sampled output signal. Since the output of element D is dependent solely on the applied frequency from generator C, the result is a regulated DC voltage being produced at the DC output of rectifier unit F.

As shown in FIG. 4A, the AC output of filter element D may be applied to a transformer E and oscillator circuit H to convert a DC input to a regulated AC output having a selectively variable and controlled output frequency. Oscillator circuit H, comprised of silicon controlled rectifier devices SCR1-4 and trigger circuits TR1 and TR2, is of a type well-known in the art. The effect of the frequency conversion means shown in circuit H is to take an AC input at a frequency $f_{in}$ from the secondaries of transformer E and convert it to a differnt output frequency $f_o$, while maintaining a constant AC voltage output. The frequency of operation of circuit H is controlled by the input of trigger control signals to trigger circuits TR1 and TR2 along lines A and B, respectively. As shown in FIG. 4B, the input trigger signals to TR1 and TR2 comprise alternating square wave pulses. The resulting regulated AC output will be a square wave of frequency $f_o$ as shown in FIG. 4C. If a phase control circuit is added to the oscillator circuit H, a sinusoidal output may be produced. As can be seen, a portion of the AC output signal is sampled, rectified and then applied to a voltage-to-frequency converter/driver G which controls the AC generator C to produce a voltage regulation control loop as described above with respect to FIGS. 2 and 3.

FIG. 5 shows a system similar to that shown in FIGS. 3 and 4A in which the output of the transformer E is applied to a cycloconverter circuit I. Cycloconversion means I of a type well-known in the art is used to convert a single phase AC input signal of a frequency $f_{in}$ from transformer E into a three or polyphase AC output at a controlled frequency $f_o$. As can be seen, unregulated DC is applied to AC generator C and then to filter element D. The AC output of filter D is applied to transformer E and then to cycloconverter circuit I. Circuit I comprises SCR devices SCR5-10 arranged in a 3×2 bridge array across the secondaries of transformer E. The SCR devices are triggered by signals supplied by an appropriate signal generating source (not shown) to their respective gates. The effect of the triggering signals is to produce a polyphase AC output at a chosen frequency which is utilized by a polyphase load. In the case of three phase operation as shown in FIG. 5, a portion of the signal appearing on eacn of the AC output lines is rectified by diodes D8, D9, and D10 to generate an error or voltage sample signal. The error signal is applied to voltage to frequency converter G which in turn adjusts the drive frequency of generator C to regulate the AC output voltage.

FIG. 6 shows a switch tap synthesizer circuit J used in the basic regulation loop. As in FIGS. 3, 4A, and 5, unregulated DC is applied to filter D and thence to transformer E. The secondaries of transformer E are connected to a switch tap AC waveform synthesizer circuit, shown generally at J. Synthesizer circuit J is a type well-known in the art and comprises a plurality of SCR devices SCR11-16 connected to the secondaries of transformer E. Each secondary of transformer E has a pair of SCR devices arranged in parallel therealong. The outputs of all but one of the secondaries are connected together to form one lead of a single phase AC output line. The remaining transformer secondary forms the other AC output line, for the half-wave synthesizer shown in circuit J. A full wave switch tap synthesizer may also be utilized. By suitable triggering of the gates of SCR devices SCR11-16 by a triggering circuit (not shown) a synthesized AC waveform may be produced along the AC output lines at a chosen frequency. FIG. 6A shows such a synthesized AC waveform with each step-wise square wave pulse being labeled to indicate the appropriate SCR device which produced it.

Referring now to FIGS. 7A-7E there are shown representative circuits which may be used to convert an AC input into a DC output. Such circuits could be used, for example, as the AC to DC converter shown at A in FIG. 2. FIG. 7A shows a single phase full-wave rectifier, while FIG. 7B shows a single phase voltage doubler configuration. Fig. 7C is a single phase half-wave rectifier and FIG. 7D shows a three phase full-wave rectifier. Finally, FIG. 7E shows a three phase half-wave rectifier circuit. The above circuits are representative of many types of prior art AC to DC power converter circuits. The purpose of these circuits is to convert input AC power to DC potential which may be applied directly to the AC generator C or which may be stored (Block B of FIG. 2) and then utilized by the AC generator C shown in FIG. 2. In the event DC power is directly available for input (such as a battery, etc.) block A of FIG. 2 is not required and may be dispensed with.

Shown in FIG. 8A-8G are representative circuits which may be used as the AC generator means of block C of FIG. 2. The basic function of these circuits is to convert an unregulated DC input into an unregulated AC output at a controlled frequency. The AC output of these circuits may be square, sinusoidal, quasi-square, or similar continuous or pulsed waveforms. Except where noted, the AC generator circuits may use SCR, ASCR (asymmetrical SCR), or GTO (gated turn-on) SCR devices. Of course other types of switching AC generators would suggest themselves to one skilled in the art and the practice of the present invention is not intended to be limited to the circuits shown in FIGS. 8A-8G.

FIG. 8A shows a basic AC generator circuit having a dual trigger input which may use SCRs, ASCRs, or GTOs as the switching devices. FIG. 8B shows a single ended AC generator circuit utilizing a GTO and having a single triggered input. FIG. 8C shows an AC generator circuit in which a single SCR has a single triggered input. FIG. 8D shows a simple AC generator using a single basedriven transistor to generate an AC output waveform. FIG. 8E shows a two transistor push-pull AC generator (triggered inverter) having a single triggered input. FIG. 8F shows a four transistor full-bridge inverter used as an AC generator. Finally, FIG. 8G shows a two-transistor half-bridge inverter used as an AC generator. Other types of AC generators, including voltage controlled oscillators, may be used.

FIG. 9 shows a representative circuit which may be used as the voltage to frequency converter/driver means G shown generally in FIG. 2. Circuit G acts as a voltage reference comparison means and a frequency controlling means to control the frequency of operation of an AC power generator C, shown in FIG. 2. The output of circuit G may be applied to any of the above described AC generators. The basic oscillator circuit consists of unijunction transistor $Q_1$, two base resistors $RB_1$ and $RB_2$, constant current generator $CR_1$, $R_1$, and $Q_2$, and timing capacitor $C_4$.

In normal operation $CR_1$ and $R_2$ establish a bias potential for the base of $Q_2$ which results in an emitter current ($I_e$) determined by $R_1$. $I_c \approx I_e - I_b$ is a constant current into $C_4$ which begins to charge towards $V_{cc}$. As the potential $V_e$ approaches the intrinsic standoff voltage (ratio) of $Q_1$, the base and emitter junction of $Q_1$ goes from a very high to a very low impedance and the energy stored in $C_1$ ($\frac{1}{2} CV^2$) is discharged through $RB_1$ thus generating a high-energy short duration pulse after which the cycle repeats. See the GE SCR Manual cited above for other types of unijunction oscillators.

With the addition (or sub traction) of current through $R_3$ to the constant current flowing in $R_1$, the charging current into $C_1$ is modified, thus changing the operating frequency of the oscillator. Error amplifier $A_1$ compares the feedback signal (error or sample signal from the output of the system) against a reference voltage and an error correcting signal is generated in the form of a current through $R_3$. Thus, the driving or triggering frequency of the AC generator C will be controlled by the voltage to frequency converter G. The above type of voltage to frequency converter/driver is of course only one of may types which may be used in the practice of the present invention.

The output of the AC generator C shown in FIG. 2 is applied to filter element D, shown in more detail in FIG. 10. The type of frequency descriminating device chosen for element D is a matter of choice to the designer; various types of devices other than the filter shown in FIG. 10 would be useful for incorporation into the present invention as would be apparent to one skilled in the art.

Device D, no matter what its construction, is characterized in that its output amplitude is a function of its input frequency. In the preferred embodiment filter device D takes the form of a frequency sensitive filter such as that shown in FIG. 10, which is also known as an OTT filter after its inventor. The OTT filter is merely representative of the class of frequency sensitive filter means. The purpose of the OTT filter is to transform a varying frequency $f_o$ and varying input voltage $V_i$ into a varying frequency $f_o$ and an output voltage $V_o$ which is a function of the input frequency $f_o$ (i.e. $V_o = f(f_o)$). FIG. 11 shows a chart of normalized values of the response of the OTT filter shown in FIG. 10. As is apparent from FIG. 11, if the input AC voltage amplitude $V_i$ into the filter D changes from a steady state to a new value the result will be zero change in amplitude at the output terminals of the filter D. Only if the operating frequency $f_o$ of the AC generator C is varied will the output amplitude $V_o$ of the filter be changed. As can be seen from FIGS. 1-6 a portion of the AC output of the filter is rectified to generate a sample or error signal which is used to control the drive frequency of a VCO or AC generator C through the voltage to frequency converter G, thus establishing a feedback control loop through the sampling and rectifying means (error or sample signal line and output rectifiers). Thus the AC or DC output amplitude of the voltage conversion system will be well regulated.

Reduced to its simplest terms, the power conversion and regulation system of the present invention operates as follows: A DC input is applied to any of the above described AC generators (block C of FIG. 2); a trigger signal, corresponding to the sampled DC output level of the system, is applied to the AC generator C from the voltage to frequency converter/driver circuit G. The response of the filter means D is such that a change in frequency of the output of the AC generator will result in an output amplitude change in the filter. Consequently, as the output amplitude of filter means D changes the feedback signal (error or sample signal) modifies the operating frequency of the AC generator as required, by means of the voltage to frequency converter/driver circuit G, thus maintaining a constant output amplitude of the system.

It will be noted that the use of the OTT filter or similar filter as a component of the regulation and conversion system has several advantages over prior art devices. First, the filter provides good voltage transfer characteristics and may be used over a wide range of operating or switching frequencies. Second, the attenuation of the filter is independent of the load. Third, the input impedance of the filter can be designed to be capacitive over the working load range; the capacitive load reflected to the AC generator or VCO aids in SCR commutation as well as the voltage output regulation. Fourth, the output of the filter is a sine wave, thus substantially eliminating the harmonic content to the load. Lastly, since the OTT filter may be used in combination with an AC generator or inverter at switching frequencies of upward of 70 KHz the components of the power conversion system may be smaller and need dissipate less heat than prior art switching power supplies which operate at around 20 KHz. Unlike prior art systems, the present invention uses the OTT filter or other frequency sensitive filter means as an active part of the voltage regulation system, rather than as a mere harmonic bandpass filter.

Thus, it can be seen that the present invention provides for a smaller, lighter, simpler, and more economical switching power supply while retaining good voltage output regulation and an ability to handle high currents and power levels. While the power conversion and regulation system of the present invention has been described in considerable detail, it is understood that various changes and modifications may occur to persons of ordinary skill in the art without departing from the spirit and scope of the invention as is defined in the appended claims.

What is claimed is:

1. A method of converting and regulating electrical power comprising the steps of:
   applying DC power to the input of an AC generator means to produce an AC output at a given frequency;
   applying said AC output to a frequency sensitive filter means, said means characterized in that its output amplitude is a function of its input frequency only;
   sampling and rectifying a portion of said output of said frequency sensitive filter means;
   applying said sampled output to a voltage reference comparison means to generate an error signal; and
   applying said error signal to a frequency controlling means connected to said AC generator to vary said frequency of said AC generator output in accordance with said sampled output of said frequency sensitive filter means to cause said sampled output to assume a steady regulated value.

2. The method of claim 1 wherein the step of applying DC power to the input of an AC generator means may further include the step of converting an AC power input into said DC power.

3. The method of claim 1 wherein the step of applying an AC output from said AC generator means to a frequency sensitive filter means comprises applying said AC output to an OTT filter.

4. The method of claim 1 wherein said step of applying an AC output to a frequency sensitive filter means may further include the step of applying said output of said frequency sensitive filter means to a voltage transformer means.

5. The method of claim 4 further including the step of applying an output from said transformer means to a cycle and/or frequency converting means.

6. The method of claim 1 further including the step of rectifying said output of said frequency sensitive filter means to produce a regulated DC output.

7. An electrical power conversion and regulation system comprising:
   a DC power input;
   means connected to said DC input for generating an AC output at a given frequency;
   frequency sensitive filter means connected to said AC output, said means characterized in that its output amplitude is a function of its input frequency only;
   means connected to said output of said frequency sensitive filter means for sampling and rectifying a portion of said output of said frequency sensitive filter means.
   voltage reference comparison means connected to said sampling and rectifying means to generate an error signal; and
   frequency sensitive filter means connected to said AC generator means and responsive to said AC output of said AC generator means to cause said output of said frequency sensitive filter means to assume a steady regulated value.

8. The system of claim 7 wherein said system may further include an unregulated AC input and an AC-to-DC converter connected to said AC input to generate said DC power input.

9. The system of claim 7 wherein said frequency discriminating means comprises a frequency sensitive filter, said filter having an AC output amplitude which is a function solely of an input frequency applied to said filter.

10. The system of claim 7 wherein said filter comprises an OTT filter.

11. The system of claim 7 further including a voltage transformer means connected to said output of said frequency sensitive filter means.

12. The system of claim 11 further including a cycle and/or frequency conversion means connected to an output of said transformer means.

13. The system of claim 7 further including rectifying means connected to said output of said frequency sensitive filter means to produce a regulated DC output therefrom.

14. The system of claim 7 wherein said frequency controlling means comprises a voltage-to-frequency converter/driver means.

15. An electrical power conversion and regulation system comprising:
   an unregulated DC power input;
   a voltage controlled oscillator connected to said DC input for generating an AC output at a given frequency;

a frequency sensitive filter means connected to said AC output, said means characterized in that its output amplitude is a function of its input frequency only;

an output sample signal line including a rectifying means, said signal line connected to said output of said filter means to generate a sample signal;

a voltage comparator having as a first input said sample signal and as a second input a reference voltage, said voltage comparator having an output connected to said voltage controlled oscillator for generating a control signal in response to a comparison of said first and second inputs to control said AC generator output frequency so as to cause said output of said filter means to assume a steady regulated value.

16. The system of claim 15 wherein said filter means comprises an OTT filter.

* * * * *